W. VOM HOFE.
Druggists' Measures.
No. 150,113.            Patented April 21, 1874.
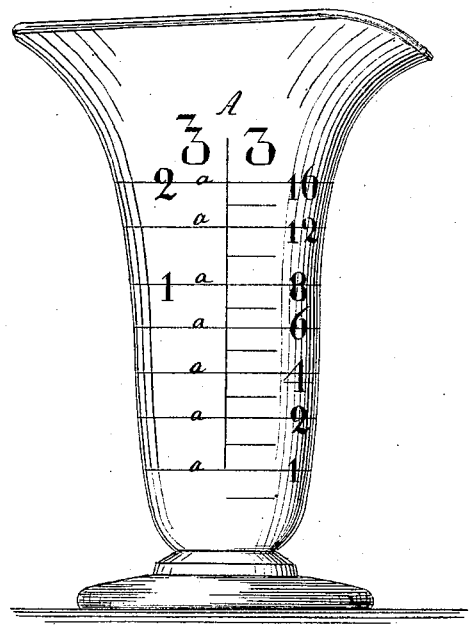
Witnesses:
Ernst Bilhuber.
Chas. Wahlers.
Inventor:
William Vom Hofe

UNITED STATES PATENT OFFICE.

WILLIAM VOM HOFE, OF NEW YORK, N. Y.

IMPROVEMENT IN DRUGGISTS' MEASURES.

Specification forming part of Letters Patent No. 150,113, dated April 21, 1874; application filed November 8, 1872.

*To all whom it may concern:*

Be it known that I, WILLIAM VOM HOFE, of the city, county, and State of New York, have invented a new and useful Improvement in Druggists' Measures; and I do hereby declare the following to be a full, clear, and exact description thereof, which will enable those skilled in the art to make and use the same, reference being had to the accompanying drawing, forming part of this specification, which drawing represents a side view of one of my improved measures.

This invention consists in a druggist's measure which is provided with unbroken measuring-lines extending all round the body of the measure in such a manner that, by such unbroken measuring-lines, the level of the liquid to be measured can be observed with ease and facility, and at the same time all variation between two detached scales placed on opposite sides of the measure is avoided, and, consequently, in measuring liquids with my measure correct results can be obtained with but little care or practice in handling the measure.

In the drawing, the letter A designates a druggist's measure, of the form commonly used for this purpose.

This measure is provided with a scale, the principal divisions of which are produced by unbroken lines *a a* extending clear round the body of the measure.

Druggists' measures, as at present sold in the market, are provided with two detached scales, one opposite the other, so as to give some aid in determining the level of the liquid contained in the measure. In making these scales the measure is placed on a horizontal table, and the standard liquid, (such as distilled water,) after having been weighed off in the quantities of one, two, three, &c., ounces, is poured into the measure, and then, by means of chalk, marks are made on opposite sides of the measure corresponding to the levels of the different quantities of liquid. In making these marks great care must be taken to get both exactly at the same level, and then the measure is placed in the hands of the glass-cutter to cut the scale. This operation also requires great care, and in many cases the marks first made on the measure are not exactly in the same level, and the cutter, in attempting to trace these marks, places the measure against his tool on one side a little too low, and on the other side a little too high, thereby still further increasing the incorrectness of the measure.

These difficulties can be obviated by my invention. In the first place, I need only one mark for each line of the scale; or if I make two marks on opposite sides of the measure, one will serve to control the correctness of the other. Then I place the measure itself in a lathe, and bring my cutting-tool to bear exactly on the mark before the lathe is started, and then I start the lathe, and produce an unbroken line extending clear round the body of the measure.

It will be readily seen that by following this plan no mistake can be made, and since my division-lines are carried clear round, the level of the liquid to be measured can be ascertained much easier and more acurately than it can with two distinct scales on opposite sides of the measure.

What I claim as new, and desire to secure by Letters Patent, is—

As a new article of manufacture, a druggist's measure, having the divisions or principle division of its scale marked by continuous unbroken lines, as herein shown and described, for the purpose specified.

WILLIAM VOM HOFE.

Witnesses:
W. HAUFF,
E. F. KASTENHUBER.